June 12, 1951  S. S. BROWN  2,556,573
ELECTRIC MOTOR
Filed Oct. 17, 1949  2 Sheets-Sheet 1
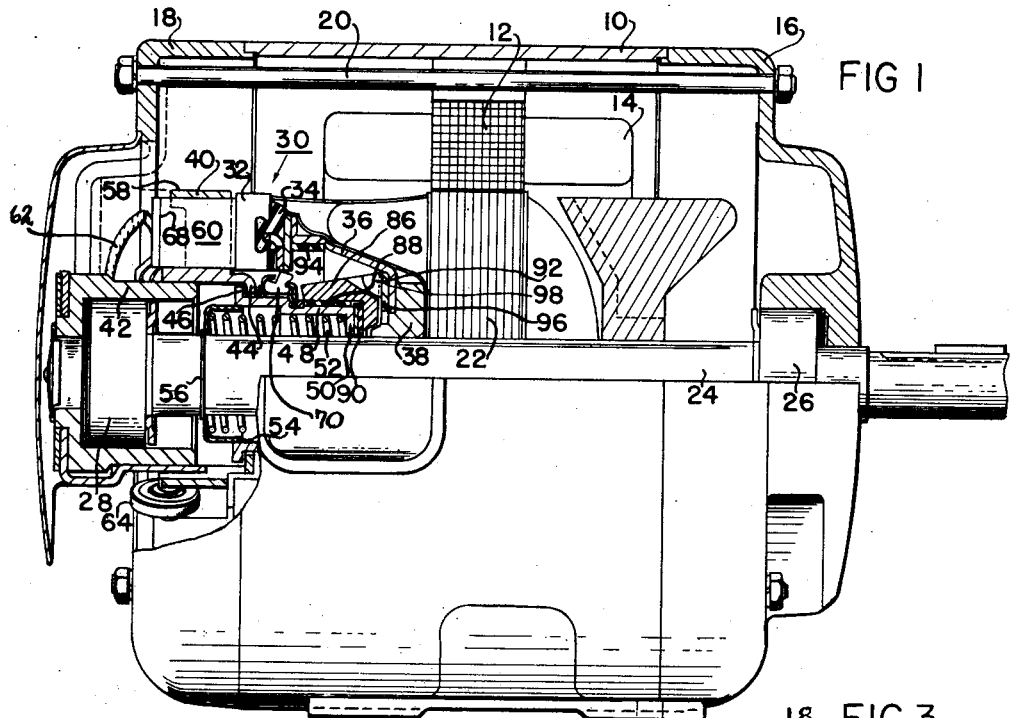
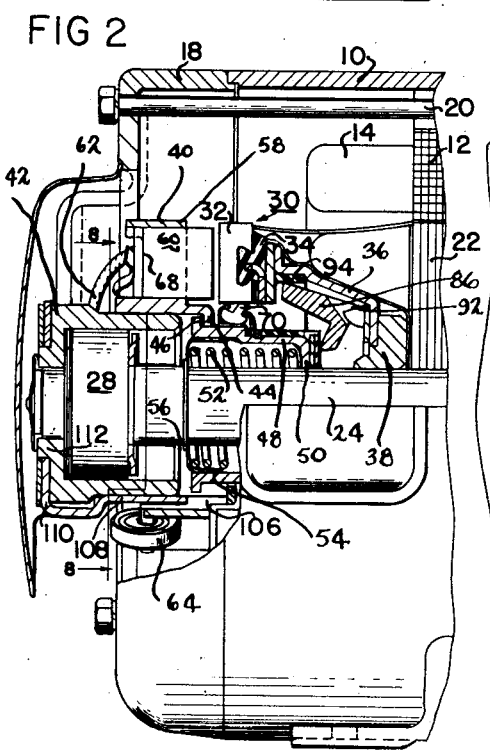
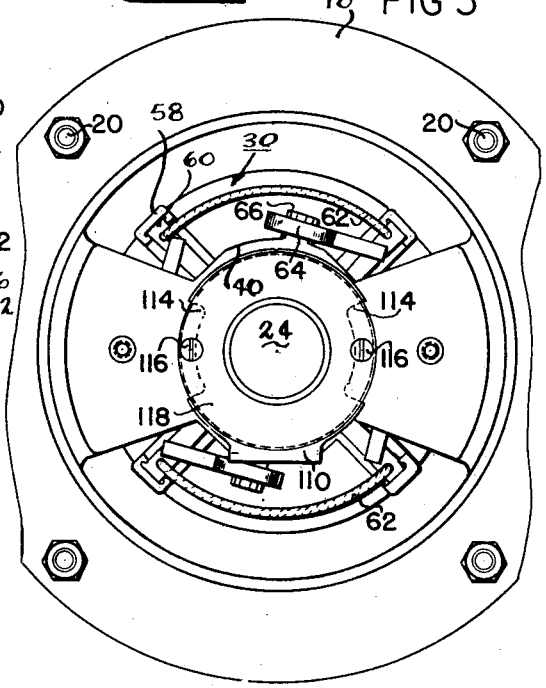
INVENTOR
STEFFEN S. BROWN
by *Taulmin & Taulmin*
ATTORNEYS

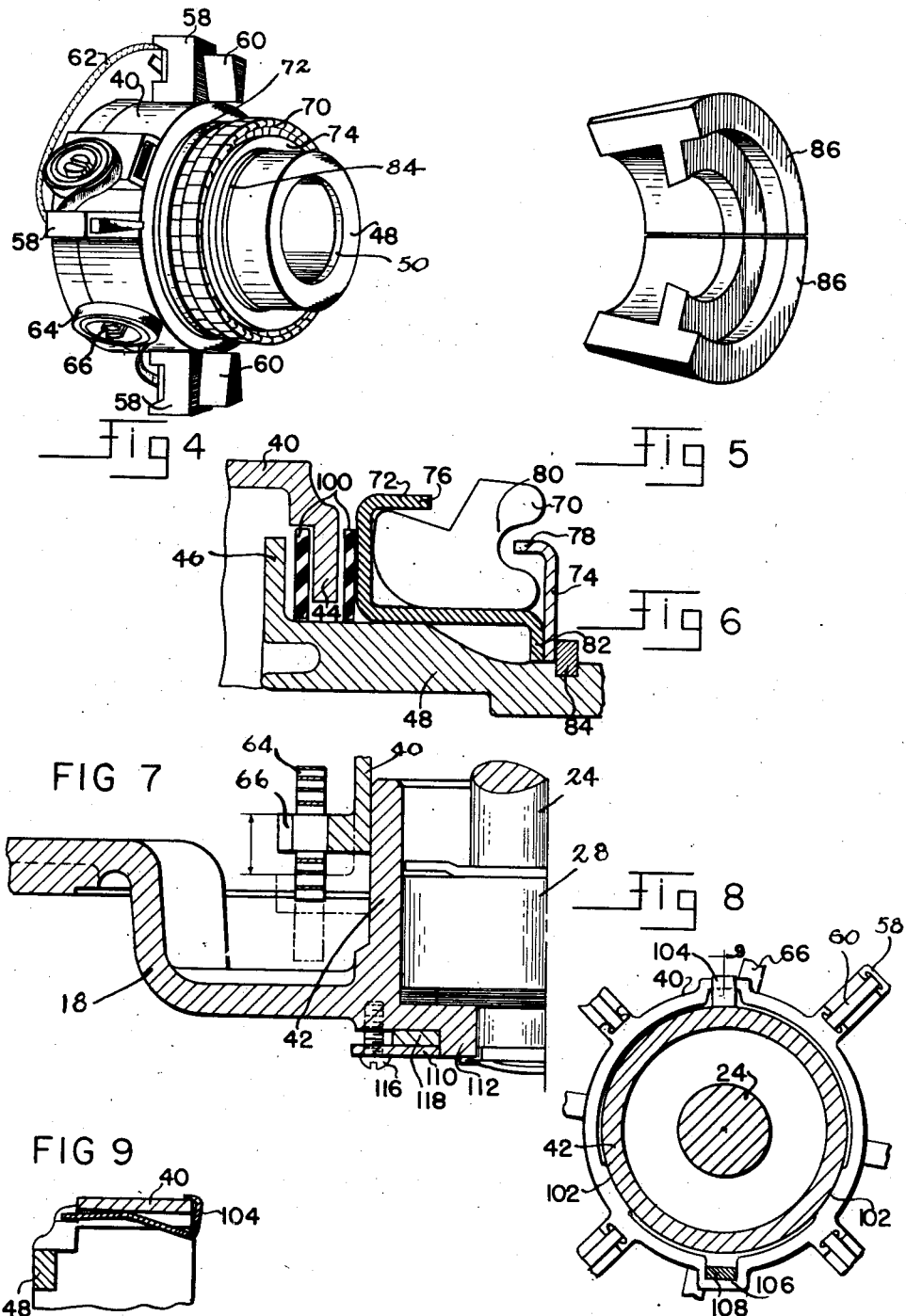

Patented June 12, 1951

2,556,573

UNITED STATES PATENT OFFICE 2,556,573

ELECTRIC MOTOR

Steffen S. Brown, Dayton, Ohio, assignor to The Brown-Brockmeyer Company, Dayton, Ohio, a corporation of Ohio Application October 17, 1949, Serial No. 121,723

9 Claims. (Cl. 172—279)

This invention relates to electric motors, and particularly to alternating current motors of the brush lifter type having a short-circuiter for the commutator.

Brush lifter type motors are well known in the art and are employed where it is desired to have a high starting torque, but, at the same time to have a quiet operating motor.

Many arrangements have been tried for lifting the brushes from the commutator of a motor of this type, and, while many thereof have been successful in accomplishing this function, they all have certain definite disadvantages, in that they are either expensive to manufacture, difficult to assemble, bulky, or noisy in operation.

A particular object of the instant invention is to provide a brush lifter and short-circuiting arrangement for the rotor of an electric motor which avoids the disadvantages referred to above in connection with prior art constructions.

Another object of this invention is to provide a brush lifter and short-circuiter arrangement in combination with the commutator of an electric motor such that said brush lifter and short-circuiter and the actuating means therefor occupy the minimum of axial space in the motor.

Another object is the provision of a brush lifting and short-circuiting arrangement for an electric motor which is readily accessible at all times for replacement of brushes, for adjustment, or for replacement.

A still further object of this invention is to provide a brush lifting and short-circuiting arrangement for an electric motor which is a substantially unitary construction and can be assembled with the rotor of the motor in a minimum of time and without the use of any special tools.

These and other objects and advantages will become more apparent upon reference to the following description taken in connection with the accompanying drawings in which:

Figure 1 is a side view of a motor embodying my invention with the upper half and part of the left end of the motor broken away;

Figure 2 is a fragmentary view similar to Figure 1 but showing the motor with the brushes lifted from the commutator and with the short-circuiter in engagement with the commutator;

Figure 3 is an end view looking in from the left side of Figure 1 showing the appearance of the brush ring with the protective canopy carried by the end bell removed therefrom;

Figure 4 is a perspective view of the unitary assembly forming the improved brush lifting and short-circuiting mechanism of my invention;

Figure 5 is a perspective view showing some of the actuating weights that are associated with the brush lifting and short-circuiting mechanism;

Figure 6 is an enlarged sectional view taken through the carrier for the short-circuiting segments showing in detail the arrangement thereof and the manner in which it is assembled with the remainder of the device;

Figure 7 is a plan section through the end bell adjacent the brush lifting and short-circuiting mechanism showing the approximate amount of movement which the said mechanism has in operation;

Figure 8 is a sectional view indicated by line 8—8 on Figure 2 showing how the brush ring is mounted on the bearing hub of the end bell; and Figure 9 is a sectional view indicated by line 9—9 on Figure 8 and showing a spring element carried by the brush ring for retaining it snugly in position on the said bearing hub.

Referring to the drawings somewhat more in detail, the short-circuiting and brush lifting mechanism shown therein is somewhat similar to that illustrated in my co-pending application, Serial No. 786,089, filed November 14, 1947, but includes features and advantages which were lacking in the construction of the said application.

In the drawings, the motor illustrated may comprise a stator frame 10 having mounted therein the stator iron 12 adapted for being energized by field coils 14. Frame 10 carries a pair of end bells 16 and 18 secured thereto, as by the through rods 20, for closing the ends of the said frame and for journaling the rotor of the motor. The said rotor includes the iron part 22 mounted on shaft 24 that is journaled in end bell 16 by bearing 26 and in end bell 18 by bearing 28. The said rotor is of the wound type, and mounted on shaft 24 at one side of the rotor iron 22 is a commutator 30.

Commutator 30 comprises a plurality of radially extending bars 32 insulatingly supported as by insulation 34, on a generally frusto-conical shell member 36 that is connected at its smaller end to a hub 38 that presses over shaft 24. The commutator bars 32 are, of course, connected with the windings on rotor iron 22 and have their sides facing leftwardly machined off flat to provide an annular surface on which the motor brushes will bear.

The brush lifting and short-circuiting arrangement of this invention includes brush ring 40 that slidably fits over bearing hub 42 that supports bearing 28 in end bell 18. The inner edge of the brush ring, that is the side toward the rotor, has a turned in flange 44 which fits over the turned out flange 46 of a follower member 48 reciprocably mounted on shaft 24 and projecting into the frusto-conical cavity surrounded by the aforementioned member 36.

The extreme right-hand end of follower member 48 has a turned in flange 50 which closely embraces shaft 24. Flange 50 forms a bearing for compression spring 52 which extends leftwardly from flange 50 into engagement with a cup part 54 that is retained in position on shaft 24 by a snap ring 56.

Returning to the brush ring part 40, this member includes a plurality of brush pockets 58 extending radially outwardly therefrom and reciprocably receiving brushes 60. Brushes 60 may be interconnected in pairs as by the leads 62, as will be seen in Figure 3, and are of tapered cross-section, as will also be seen in Figure 3. The brushes are urged inwardly toward the face of the commutator by torsion springs 64 that are mounted on split studs 66 projecting outwardly from the brush ring between the brush pockets.

Brushes 60 preferably include shoulders 68 which engage the edges of pockets 58 and stop the brushes in their inward movement so that when the brush ring is moved away from the commutator, the brushes also will move away from the commutator. This is brought out in Figures 1 and 2, where Figure 1 shows the brushes riding on the commutator, and Figure 2 shows the brushes lifted off the commutator. It will be noted in these views that the brush ring has substantially greater movement than the said brushes.

The provision of the shoulders on the brushes is of particular importance in connection with a vertically mounted motor with the commutator at the upper end, because under these circumstances, the brushes might have a tendency to fall completely through the brush pockets and remain on the commutator, even after the brush ring was moved to its brush lifting position. By the provision of the shoulders, this is prevented and the brushes are at all times positively lifted from the commutator by movement of the brush ring.

The short-circuiting portion of the device comprises a plurality of short-circuiter segments 70 annularly arranged about a path inside the commutator, as will be seen in Figures 1 and 2. These segments 70 are carried by a pair of members 72 and 74 which have turned in edge parts, as at 76 and 78, for embracing the reduced neck 80 of the short-circuiter segments. Member 72 is pressed on follower member 48, as will best be seen in Figure 6, and is positively positioned on the said member by means of the turned in flange 82 of member 72 that abuts a shoulder turned on the said follower member.

Member 74 is of a size to closely fit over said follower member, and when assembled thereon with member 72 and short-circuiter segments 70, is retained in position by a snap ring 84. It will be noted in Figure 6 that segments 70 have a certain amount of freedom axially within their carrier, and this is of benefit in giving improved action of the short-circuiting device, because the short-circuiter engages the commutator at a higher speed of rotation of the rotor than it leaves the commutator. This is a desirable characteristic in connection with motors of this type and insures that momentary overloads on the motor will not cause the short-circuiter to leave the commutator, thereby resulting in sparking and an undue amount of wear.

For actuating the follower member 48 to carry the short-circuiter segments into engagement with the commutator and to move the brush ring away from the commutator, there are provided within frusto-conical member 36 the weights 86 which are generally L-shaped in cross-section, as will be seen in Figures 1 and 2. The longer of the legs of the weights 86 lie along follower member 48 when the rotor is at rest, and there may advantageously be provided the rubber sleeve 88 which prevents the said legs from striking the follower member in such a manner as to create noise or damage.

The shorter legs of the weights lie along the inner end of follower member, 48, and there is preferably interposed between the end of the follower member and the said short legs the washer means 90 which may be constructed of a plastic or fiber and impregnated with oil or grease to obtain friction-free engagement of the follower member by the said weights.

The weights are arranged to pivot about their corners, indicated at 92, and, when the rotor reaches a predetermined speed, the weights throw out about their said corners to the position in which they are shown in Figure 2. In this position the weights have urged follower member 48 leftwardly against the thrust of spring 52, so that the short-circuiter segments are carried into engagement with the commutator, and the brush ring has been moved leftwardly away from the commutator. The annular rubber ring 94 may be so positioned within member 36 that it engages the ends of the longer legs of the weights when they have thrown out, thereby preventing noisy or damaging engagement of the weights with the said member.

Inasmuch as the rotor accelerates rapidly during starting, it may be preferable to provide at the bottom of member 36 a plate 96 having turned out tabs 98 which engage notches in weights 86 or extend between the said weights and thereby prevent relative circumferential movement therebetween during the starting period of the motor.

It has been mentioned previously that a brush lifting and short-circuiting arrangement of this construction is quiet in operation. The means for achieving this quietness of operation are illustrated in Figures 6, 8, and 9. In Figure 6, it will be noted that brush ring 40 and follower member 48 are prevented from ever coming into direct contact by the spacing washer 100 on either side of flange 44 of the said brush ring. The spacing washers 100 are of such radial extent that it is impossible for there to be any direct metal to metal contact between the brush ring and the follower member. Further, the washers are of fiber or a suitable composition that will retain oil or grease and are impregnated for lubricating the running joint between the brush ring and follower member for substantially the life of the motor.

Another provision for insuring quietness of operation is the arrangement for supporting the brush ring on bearing hub 42. In Figure 8 it will be noted that the brush ring 40 fits loosely over hub 42, and that there are formed on the inner face of brush ring 40 the projections 102 that engage the outer surface of the bearing hub at spaced points substantially 120 degrees apart.

A third engagement of the brush ring with the bearing hub is obtained by the spring member 104 shown in Figures 8 and 9 and by means of which the brush ring is held on the hub firmly at all times so that it does not vibrate and rattle. At the same time, a reduced area of contact of the brush ring with the bearing hub, due to the projections 102 and spring 104, permits easy shifting movement of the brush ring therealong when the weights 86 throw out.

While the commutator of the rotor, the weights 86, the short-circuiter, and the follower member 48 all rotate in unison, the brush ring 40 remains stationary, except for its axial movement. For preventing the brush ring from rotating and to precisely locate the brush ring angularly, there is included a generally rectangular pocket 106 at one side of the bearing hub. Into this pocket 106 there extends a projection 108 formed on a disk member 110 mounted about the reduced diameter projection 112 formed on the outer surface of bearing hub 42.

As will be seen in Figure 3, member 110 has notches 114 cut therein, and these receive screws 116 extending through a clamping disk 118 also mounted about the reduced diameter portion 112 of the said bearing hub. By the arrangement described, member 110 can be tightly clamped in any position of adjustment, and this will positively retain the brush ring 40 in a corresponding position of adjustment, but at the same time, the brush ring is free to reciprocate on hub 42 in accordance with movements of weights 86.

It is to be noted, as will be seen in Figure 3, that the arrangement of the end bell at the commutator end of the motor is such that removal of the protective canopy will expose the brush ring for inspection or replacement of brushes therein. This can be done without removing the end bell, and if it should be desirable to remove the brush ring and short-circuiter assembly, this can readily be accomplished by removing the end bell and detaching the assembly from the armature shaft merely by removing snap ring 56, the said snap ring providing the sole means for retaining the short-circuiter and brush ring unit in assembled position with the rotor.

It will be understood that this invention is susceptible to modification in order to adapt it to different usages and conditions, and, accordingly, it is desired to comprehend such modifications within this invention as may fall within the scope of the appended claims.

I claim:

1. In combination in a brush lifter type motor having an axially movable brush ring and a commutator; a hollow shell supporting the commutator on the shaft of the motor forming a frusto-conical cavity with its small end inwardly from the commutator, a generally tubular member reciprocable on the shaft of the motor and in engagement with said brush ring for moving it toward and away from the commutator, and a plurality of substantially L-shaped weights surrounding said shaft and loosely disposed within said shell and each having one of its leg parts disposed between the end of said member and the bottom of said shell and the other of its leg parts lying along the said tubular member and being divergent with the shell from the said bottom outwardly, said weights being pivotal about the corner at the bottom of said cavity whereby at a predetermined rotational speed of the shaft and shell they will pivot outwardly about the corner and move said tubular member axially.

2. In combination in a brush lifter type motor having an axially movable brush ring and a commutator; a hollow shell for supporting the commutator on the shaft of the motor forming a frusto-conical cavity with its small end inwardly from the commutator, a generally tubular member reciprocable on the shaft of the motor and in engagement with said brush ring for moving it toward and away from the commutator, and a plurality of substantially L-shaped weights surrounding said shaft and loosely disposed within said shell and each having the shorter of its leg parts disposed between the end of said member and the bottom of said shell and the longer of its leg parts lying along the said tubular member and divergent with the side wall of the shell from the bottom thereof outwardly, said weights being pivotal about the corner at the bottom of said cavity whereby at a predetermined speed of the shaft and shell the weights will pivot outwardly about the corner and move the tubular member axially, and means in said shell engaging said weights to predetermine the circumferential spacing thereof.

3. In an electric motor having a wound rotor with a shaft; a commutator at one end of the rotor comprising radial bars and a supporting shell for the bars mounted on said shaft, an axially movable brush ring adjacent the commutator and brushes reciprocable therein for engagement with the commutator, a generally tubular member reciprocable on said shaft and extending into said shell, said member and brush ring having interengaging parts for movement of said brush ring by said member, resilient means urging said member in a direction to move said brush ring toward said commutator, and a plurality of arcuate L-shaped weights loosely disposed in said shell with their shorter legs between the bottom thereof and the inner end of said member and their longer legs lying along said member and divergent with said shell whereby the weights form centrifugal actuator means responsive to a predetermined rotational speed of said shaft for moving said member against the thrust of said resilient means.

4. In combination in a brush lifter type electric motor having a shaft, a commutator, and an axially movable brush ring; a hollow supporting shell for mounting said commutator on said shaft, a generally tubular member reciprocable on said shaft and extending into said shell, said tubular member engaging said brush ring for moving it toward and away from said commutator, a plurality of arcuate weights loosely disposed about the bottom of said shell and each thereof being substantially L-shaped in cross-section and having the short leg thereof disposed between the inner end of said tubular member at the bottom of said shell and the long leg thereof disposed between the member and the side wall of the shell and divergent with the shell from the bottom thereof outwardly, and short-circuiter means mounted on said tubular member and adapted for being moved thereby into short-circuiting engagement with said commutator when said member moves said brush ring away from said commutator.

5. The combination in an electric motor; of a brush ring having an inwardly projecting flange, a tubular member having an outwardly projecting flange on one side of the flange on the brush ring and a shoulder on the other side facing the same direction as said flange on said member, a short-circuiter assembly on said member against the said shoulder projecting outwardly so as to confine the flange on the brush ring, means releasably retaining said short-circuiter in position on said member, said short-circuiter assembly comprising a pair of rings defining an outwardly opening annular channel therebetween and a plurality of segments loosely positioned between said rings in an annular path, the outer edges of said rings being bent in to retain the segments in place, and means for moving said tubular member axially to make said brush ring and said short-circuiter assembly selectively effective.

6. In an electric motor comprising a frame for supporting the motor stator and end members for mounting bearings for supporting the shaft for the rotor of the motor; a commutator for said rotor at one end thereof mounted on said shaft, a brush ring adjacent said commutator, a bearing hub on the end member of the motor over which said brush ring is reciprocably mounted, means for moving the brush ring toward and away from said commutator on said bearing hub, and means supporting said brush ring on said bearing hub comprising circumferentially spaced inwardly extending axial projections on said brush ring so that the engagement thereof with said bearing hub is relatively friction-free, one of said inwardly extending projections comprising axially extending resilient leaf member whereby said brush ring is held on said bearing hub without vibratory movement.

7. In an electric motor; an end bell having a centrally located bearing hub projecting inwardly therefrom, a brush ring reciprocably mounted on said bearing hub, a reduced diameter portion on said hub externally of said end bell, a plate apertured to fit over said reduced diameter portion mounted on said hub externally thereof and having a projecting part engaging said brush ring to hold the said brush ring against rotation while permitting axial movement thereof, and means for securing said plate in a plurality of positions for selectively positioning said brush ring to determine the operating characteristics of said motor.

8. In an electric motor; an end bell having a centrally located bearing hub projecting inwardly therefrom, a brush ring reciprocably mounted on said bearing hub, a reduced diameter portion on said hub externally of said end bell, a plate apertured to fit over said reduced diameter portion mounted on said hub externally thereof and having a projecting part engaging said brush ring to hold the said brush ring against rotation while permitting axial movement thereof, and a second plate also apertured to fit over the reduced diameter portion of said hub and overlying said first mentioned plate and clamped to the end bell for holding the said first mentioned plate and brush ring against circumferential movement about the bearing hub.

9. In a brush lifter type electric motor having a commutator with radial bars, a brush ring axially movable toward and away from said commutator, and a short-circuiter movable into and out of engagement with said commutator, said commutator having a hollow supporting shell, the combination of; centrifugal actuator means comprising weights loosely disposed within said shell, a single tubular element extending into said shell to be acted on by said centrifugal actuator and having engagement with said brush ring and supporting said short-circuiter, a single resilient means acting on said tubular member for urging it in a direction to bring brushes in said brush ring into engagement with said commutator and to move said short-circuiter out of engagement with said commutator, a cup element telescoping said member and receiving the end of said resilient means opposite its engagement with said tubular member, and means retaining said cup element on the shaft of the motor and forming the sole means for retaining the centrifugal actuator and tubular element in assembled relation with the motor.

STEFFEN S. BROWN.

REFERENCES CITED

The following references are of record in the file of this patent:

UNITED STATES PATENTS

| Number | Name | Date |
| --- | --- | --- |
| 922,521 | Schnur | May 25, 1909 |
| 1,090,328 | Mills | Mar. 17, 1914 |
| 1,130,017 | Pillsbury | Mar. 2, 1915 |
| 1,145,594 | Kennedy | July 6, 1915 |
| 1,209,443 | Jeannin | Dec. 19, 1916 |
| 1,389,137 | Gysel | Aug. 30, 1921 |
| 1,684,941 | Bullivant | Sept. 18, 1928 |
| 1,750,076 | Weichsel | Mar. 11, 1930 |
| 1,872,948 | Henry | Aug. 23, 1932 |
| 1,881,666 | Kindl | Oct. 11, 1932 |
| 1,994,504 | Burnite | Mar. 19, 1935 |